Figure 1:
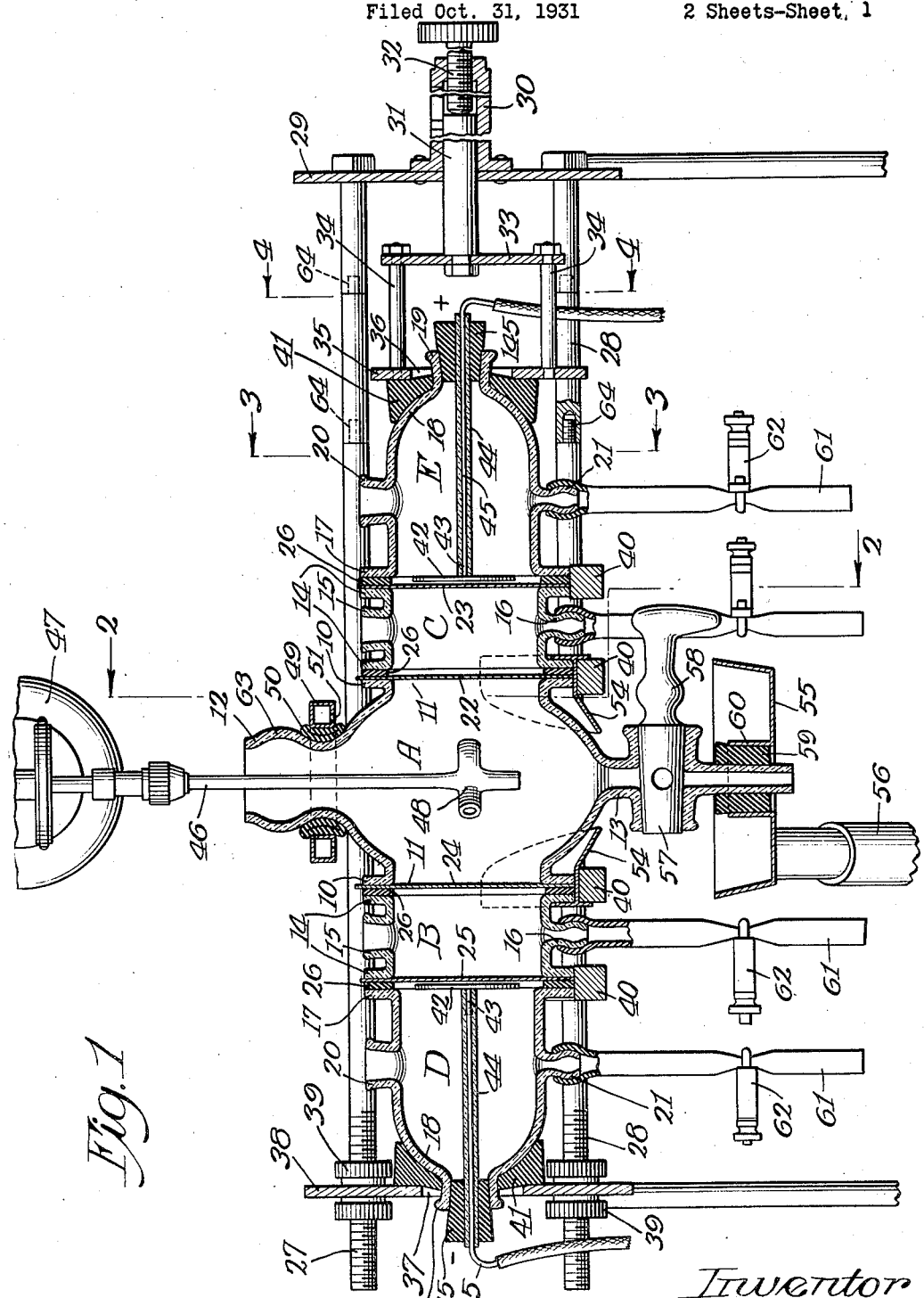

Sept. 12, 1933. A. LÖDDESÖL 1,926,591
ELECTRODIALYZER
Filed Oct. 31, 1931 2 Sheets-Sheet 1

Inventor
Aasulv Loddesol

Sept. 12, 1933.　　　　A. LÖDDESÖL　　　　1,926,591
ELECTRODIALYZER
Filed Oct. 31, 1931　　　2 Sheets-Sheet 2
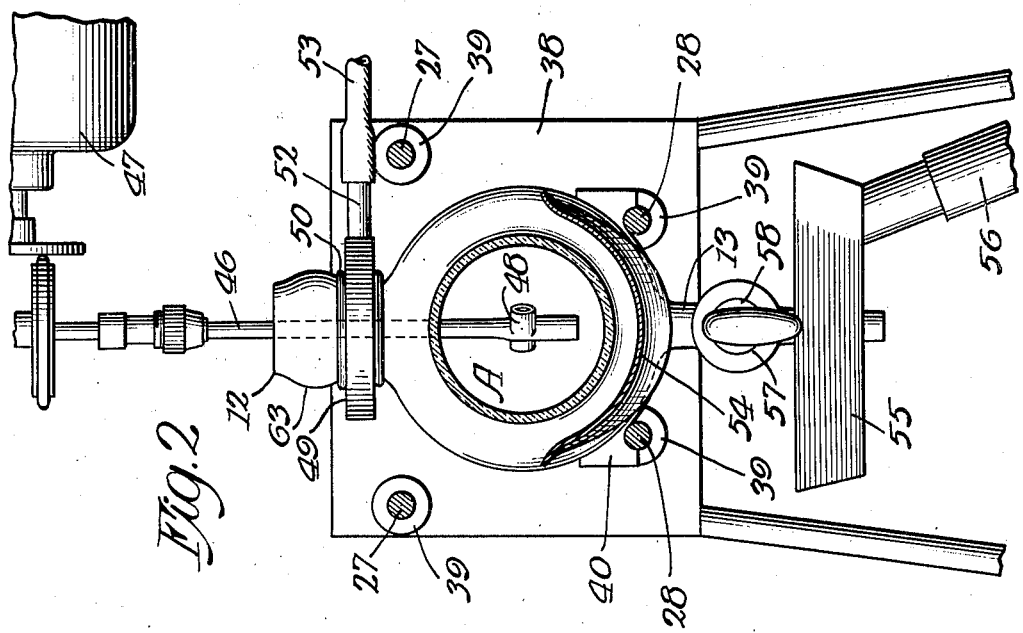
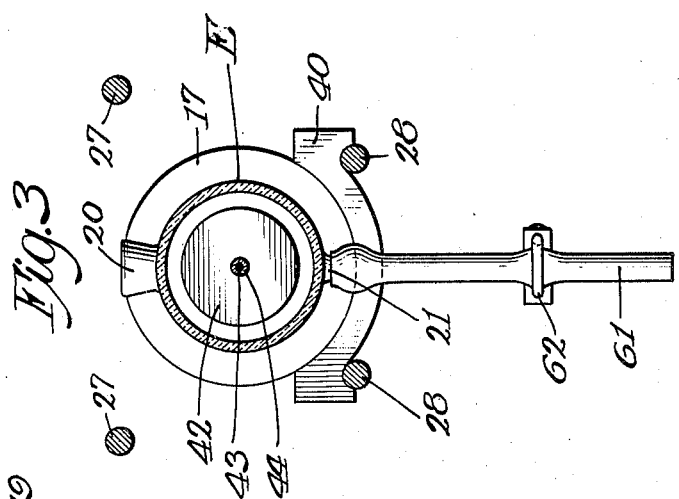
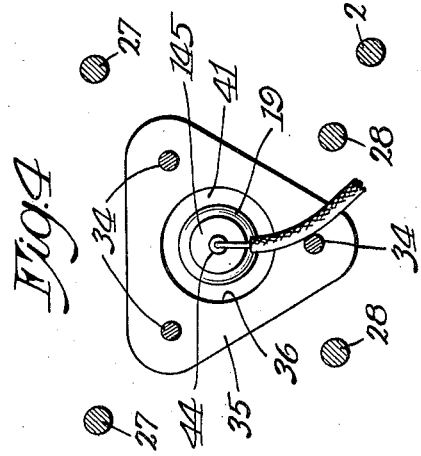
Inventor:
Aasulv Loddesol Patented Sept. 12, 1933

1,926,591

UNITED STATES PATENT OFFICE 1,926,591

ELECTRODIALYZER

Aasulv Löddesöl, Aas, near Oslo, Norway

Application October 31, 1931. Serial No. 572,424

13 Claims. (Cl. 204—1)

The principal object of this invention is to promote the accurate and efficient dialysis of soil by providing new apparatus and procedure that can be used by persons of relatively little experience in the science of soil dialysis. Further objects and advantages will be revealed as the disclosure proceeds and the description is read in connection with the accompanying drawings showing apparatus now thought best, and in which Fig. 1 is a longitudinal sectional view, and Figs. 2, 3 and 4 are transverse sectional views taken on the lines 2—2, 3—3 and 4—4 of Fig. 1, respectively.

But this specific illustration and the specific description are used for the purpose of disclosure only. In the nature of things, the substance of the invention can be, and in some instances should be embodied in different forms, and the procedure should be altered to suit the needs of the case.

In some instances the best form of apparatus and the best procedure will have to be determined empirically, but the following taken in connection with the drawings will serve as sufficient guide.

The apparatus shown in Fig. 1 includes five chambers A, B, C, D and E, although three will serve for some purposes and more than five are useful for others.

The central or primary treatment chamber A is generally globular in shape, modified at the right and left to provide flanges 10 surrounding openings 11, modified at the top to provide a charging neck 12, and modified at the bottom to provide a discharge spout 13.

The chambers B and C are generally cylindrical in form, modified at the ends to provide flanges 14, at the top to provide a neck 15, and at the bottom to provide a spout 16. The chambers D and E are, in part, cylindrical, modified at one end to provide a flange 17, contracted at the other end in somewhat hemispherical form, as indicated at 18, and provided with a neck 19. They are also provided at the top with a neck 20 and at the bottom with a spout 21.

The chambers now in use are made of pyrex glass, but any sort of material that will resist the action of the elements in the presence of the electrical current and heat may be selected according to particular requirements and individual preference.

Chambers A, C and E are separated by electrodialysis membranes 22 and 23 of cellophane one thousandth of an inch (.001") thick.

The chambers A, B and D, are separated by electrodialysis membranes 24 and 25 of vegetable parchment two thousandths of an inch (.002") thick. However, both the materials and the thicknesses of the membranes are, to some extent, a matter of selection according to the circumstances.

As shown, in Fig. 1, the membranes are merely inserted between adjacent flanges 10 and 14 in the one instance and 14 and 17 in the other instance, together with rubber gaskets 26. The assembly thus formed is securely clamped in operative position by a frame consisting generally of four threaded rods 27—27 above and 28—28 below (compare the longitudinal and transverse sections) passing through end plates 29 and 38, and a pressure device shown at the right in Fig. 1. This includes a socket 30 secured to the plate 29 and receiving a plunger 31 acted upon by a thumb screw 32 in the socket. The left end of the plunger carries a triangular plate 33 equipped with three rods 34 (see Fig. 4) carrying a second triangular plate 35, having a central opening 36, roughly corresponding to an opening 37 in the plate 38.

In assembling, the frame is loosely set up, as shown in the drawings, and the length is roughly approximated by running the nuts 39, which are swiveled to the plate 38, on the threads of the rods 27 and 28.

Cross bearers 40 (Figs. 1 and 3) are then placed on the rods 28 and the glass chambers assembled loosely and approximately in the positions they are to occupy, heavy yielding gaskets 41 being fitted over the necks of the chambers D and E.

The plate 35 will be somewhat to the right from its position in Fig. 1, but not sufficiently to permit the flanges 10, 14 and 17 to be displaced from the cross bearers. In this condition of support and loose assembly it is comparatively easy to insert the membranes 22, 23, 24 and 25, and the gaskets 26, after which the screw 32 is run up to clamp the several chambers together and seal the joints between them.

Platinum rhodium electrodes 42 are mounted at the outer side of the membranes 23 and 25 within the chambers D and E. They are carried on the ends of short platinum wires 43 sealed into glass tubes 44, and electrically connected with lead-in wires 45. The tubes 44 are carried by stoppers 145 forced in the necks 19 of the chambers E.

In the particular apparatus illustrated the chamber A has a capacity of 450 c. c., the chambers B and C a capacity of 60 c. c., and the electrodes are about 4 c. m. in diameter, and a direct current of not more than 2 amperes is ordinarily used.

A glass stirrer 46 driven by a motor 47, mounted in any suitable manner, projects into the chamber A, and is equipped with a T-shaped head 48, all three arms of which are hollow, and the two horizontally disposed arms are curved oppositely.

A ring-like nozzle 49 is fitted about the neck 12 on the gasket 50 and provided with many small perforations 51 in the bottom wall, to discharge streams of a cooling liquid onto the globular exterior of the chamber A. At one side (see Fig. 2) the nozzle is provided with a nipple 52 to receive a hose 53 by which the liquid is supplied. Copper baffles (see Figs. 1 and 2) 54 are fitted about the lower portions of the flanges 10 and 14 and rest on the cross bearers 40 and serve to direct the cooling liquid from the underside of the chamber A into a catch basin 55, fitted with a hose 56.

The discharge spout 13 of the chamber A is equipped with a cock 57, the handle of which is provided with a knob 58 to direct the drip into the basin 55. The spout 13 is projected beyond the cock through the basin, which latter is fitted thereto by means of a stopper 59, pressed between the spout and the collar 60 in the basin. This arrangement permits the contents of the chamber A to be discharged into a suitable receptacle while the cooling liquid is being circulated.

The spouts 16 and 21 are equipped with short lengths of hose 61 fitted with clamps 62.

The rods 27 and 28 may be made in sections threaded together as indicated at 64, whereby they may be shortened to properly accommodate a small number of chambers or lengthened to accommodate a large number of chambers.

*Operation*

Assuming the electrical connection to be made, the apparatus properly clamped in assembled position, the stop cock 57 closed and clamps 62 in place, the several chambers are charged with distilled water; all except chamber A are filled. This chamber is given a partial charge, the extent depending on the volume of the specimen to be dialyzed; 10 to 50 grams dry weight of soil is put in the chamber A and the stirrer started. As the soluble constituents go into solution more water may be added, and finally this chamber should be charged to about the bottom of the neck. When a specimen has been reduced partly to a suspension, substantially uniform, the current is turned on, and the water or other cooling fluid is turned onto the nozzle 49.

During the operation the charge in the main chamber A will tend to increase in volume on account of osmosis, and for that reason the neck 12 is given a bulge 63 to take up this apparent expansion and prevent the stirrer from throwing any portion of the charge over the side.

The simplest explanation of the process of dialysis is on the basis of the ionic theory, in which it is assumed that the molecules of all substances, in water solution, are to some extent split up, generally into two particles per molecule. The two particles, or ions, carry opposite electrical charges. When a potential difference is applied across electrodes in a solution of an electrolyte, the positive ions, or cations, migrate toward the negative electrode, or cathode, while the negative anions migrate toward the anode. Another postulate of the ionic theory, however, is that no portion of a solution ever contains more anions than cations, or more cations than anions. Then, for a flow of ions out of the middle chamber toward the electrodes to be possible, there must be a continuous discharge of anions at the anode, and a continuous discharge of cations at an equal rate at the cathode.

In general, the ions discharged at the electrodes will be hydrogen and hydroxyl ions. Hence, as each cation passes through membrane 24 from the main chamber, a hydrogen ion must be discharged upon the cathode 42. Because of the discharge of the hydrogen ion, there will be a free hydroxyl ion in the chambers B and D along with the cation which came from the main chamber A. Originally, the chambers other than the main chamber contained distilled water. Hence, at the end of the process the chambers B and D will contain, in addition, only cations from the main chamber plus hydroxyl ions. In other words, the chambers on the cathode side of the main chamber will contain solutions of bases; likewise the chambers on the anode side will contain solutions of acids.

The membranes separating the main chamber A from the chambers B and C should not be permeable to the colloidal particles of the soil suspension, but should allow the much smaller ionic particles to pass through. Since the rate of migration of various ions, under the same conditions, varies greatly, some of the ions, such as the anions of the humus acids, may be trapped in the first chamber, while other ions during the same treatment have passed to succeeding chambers. Various fractions, containing the different ions, may thus be drawn from the dialysis chambers B, C, D and E. The membranes 23 and 25 may be so chosen as to facilitate the separation by offering greater resistance to the passage of some ions.

It follows that the nature and number of the chambers and the diaphragms may be varied to advantage dependent upon the characteristics of the material to be dialyzed, and the extent to which the separation is sought.

It has been found that it is best to use a negative membrane such as parchment on the cathode side, and a positive or less negative membrane such as cellophane on the anode side. The probable reason why such an arrangement is preferable is that the penetration of ions is facilitated when the membranes have an electrical charge opposite to that of the ions which are transported toward the corresponding electrode. In other words, negatively charged membranes are more permeable for cations than they are for anions, and positively charged membranes are more permeable for anions than for cations.

At present it is not certain whether cellophane is a positive membrane, or merely less negative than parchment. Even if it is only less negative than parchment, however, it is clear that cellophane will be better than parchment for an anode membrane.

The results of some experiments to determine what arrangement of membranes would allow passage of the greatest number of ions are shown in Table I. It is to be understood that an experiment in which one soil is used is comparable only with an experiment in which the same soil is treated. For each experiment the sum of the milliequivalents (M. e.) of anions and cations transported through the membranes from the soil suspension is given.

Table I

|  | Cathode membrane | Anode membrane | Sum |
|---|---|---|---|
| Soil 7A | Parchment | Parchment | 1.519 M.e. |
| Soil 7A | Parchment | Cellophane | 1.859 M.e. |
| Soil 79A | Parchment | Parchment | 1.952 M.e. |
| Soil 79A | Parchment | Cellophane | 2.091 M.e. |
| Soil 48A | Cellophane | Parchment | 2.000 M.e. |
| Soil 48A | Cellophane | Cellophane | 2.216 M.e. |

The greater quantities of ions transported when cellophane was used as anode membrane indicate that this material should be preferred to parchment for an anode membrane. The ammeter readings during the experiments also showed that the current rose to higher values, that the maximum amperage was obtained after shorter periods of time and, hence, that the resistance due to the anode membrane itself was less in the cases where cellophane was used.

The globular form of the main or primary chamber offers great advantage in stirring the specimen under treatment and cooling it by exterior application. The interior form lends itself to such movement of the soil suspension under the action of the stirrer as to discourage settling and promote solution and suspension. Any cooling apparatus on the interior would form an obstruction to the movement and promote eddies and pockets in which sediment would settle. The globular exterior lends itself readily to the even flow of water for promoting uniform and rapid cooling.

It is of advantage to keep such conditions as voltage applied to the electrodes and temperature of the globular chamber constant during the dialysis, in order to obtain reproducible results. Similar conditions during the dialyses of different soils are highly important to maintain if the results of the determinations are to be used to compare the properties of the soils. Because of the adaptability of the invention to the dialyses of various soils, it can be used to perform experiments under reproducible conditions. The efficient and convenient cooling means provided allows the temperature to be held constant without the variable terminal voltage which would otherwise be necessary.

In the dialysis of Ontario loam soils, it was found that without the use of a cooling system, the temperature in the main chamber rose within a short time to 40°–50° C. But the temperature was easily held within the predetermined range of 23°–25° C. in the apparatus of Fig. 1, when ordinary tap water was used as the cooling fluid.

The especial necessity for regulation of temperature is based on the fact that temperature has an important influence on the rate of liberation of ions from the soil suspension; the rate of cation liberation may increase as much as 2.5% per degree centigrade increase in temperature.

Obviously, the amount of cooling necessary depends upon the amount of potential difference applied to the electrodes. In order to demonstrate the desirability of using higher voltages, which are made possible by the efficient cooling system provided in the invention, the results of an experiment are given, in which two identical soil samples were dialyzed under conditions similar except for the electrode potentials used. During the same length of time, 25.135 M. e. of cations and 2.976 M. e. of anions were liberated from a 100 gram sample by the use of 110 volts across the electrodes, while 30.027 M. e. of cations and 4.113 M. e. of anions were liberated from another 100 gram sample by the application of 220 volts to the terminals. Speeding up the dialysis by increasing the voltage used may cut hours off the time required. The necessity for keeping constant the terminal voltage in addition to the temperature is also shown by the above data.

At the beginning of the dialysis the current will run up comparatively high and so remain for a matter of hours, but in the course of 12 to 24 hours it will drop down, sometimes rather sharply, but usually more gradually, and when it becomes substantially uniform the treatment, at least so far as the middle chamber is concerned, is substantially complete. At that stage the stop cock 57 should be opened and the remainder of the charge removed; then the cock should be closed and the chamber filled with distilled water, if the treatment in the other chambers is to continue. In the meantime this residual portion of the charge may be subjected to such examination or analysis as desirable.

For the purposes of some experiments, the dialysates in the end chambers may be removed at certain intervals and the chambers refilled with distilled water. The fractions obtained are analyzed for the ions liberated. A determination of the total amounts of cations or anions present in a dialysate fraction may be made by titration against HCl or NaOH, with the use of methyl red and phenolphthalein as the respective indicators. At the same time as the end chambers are drained a small portion of the soil suspension may be removed from the middle chamber for various measurements. After the desired measurements of the soil portions are taken they must be dried and weighed in order that the amount of soil remaining in the middle chamber can be calculated.

Frequent changing of the dialysates facilitates the exchange process, since the resistances in the end chambers increase when the concentrations of the ions increase.

The globular shape of the main chamber, and other features of the apparatus are provided in order that the main chamber A may have a maximum capacity without other parts of the apparatus being made inconveniently large. The necessity for great capacity of the soil suspension chamber has been discovered through a series of experiments, part of the results of which are given below in Table II.

In fractional electrodialysis experiments the concentration of the soil suspension decreases from fraction to fraction. Thus it will be understood that it is necessary to start with a large soil sample in order to get sufficient amounts of ions for the analytical procedure in the last fractions. The results obtained for each of the various fractions and for the whole experiment will then be more significant.

But when a large soil sample is used, it has been found desirable to provide a large chamber to accommodate enough water along with the soil so that the suspension is still fairly dilute.

The extent to which difference in concentration of the soil suspension affects the rate of replacement of ions was investigated by dialyzing different sized samples each suspended in 110 c. c. of water. In Table II are given the results of part of the experiments.

cations from easily soluble salts present in the soils. In many cases, especially in soils from

Table II

| Fractions | Dialysates changed after hours | Experiment with 25-gram sample | | | | Experiment with 50-gram sample | | | |
|---|---|---|---|---|---|---|---|---|---|
| | | M.e. cations per 100 grs. soil | | M.e. anions per 100 grs. soil | | M.e. cations per 100 grs. soil | | M.e. anions per 100 grs. soil | |
| | | Per fraction | Average per hour | Per fraction | Average per hour | Per fraction | Average per hour | Per fraction | Average per hour |
| 1* | 2 | 3 | 4 | 5 | 6 | 7 | 8 | 9 | 10 |
| a | 12 | 2.474 | 0.206 | 0.538 | 0.030 | 1.689 | 0.141 | 0.342 | 0.029 |
| b | 24 | 0.444 | 0.037 | 0.234 | 0.020 | 0.875 | 0.073 | 0.165 | 0.014 |
| c | 36 | 0.206 | 0.017 | 0.140 | 0.012 | 0.347 | 0.029 | 0.159 | 0.013 |
| d | 48 | 0.085 | 0.007 | 0.109 | 0.009 | 0.198 | 0.017 | 0.100 | 0.008 |
| e | 60 | 0.069 | 0.006 | 0.084 | 0.007 | 0.161 | 0.013 | 0.104 | 0.009 |
| f | 72 | 0.057 | 0.005 | 0.083 | 0.007 | 0.090 | 0.008 | 0.104 | 0.009 |
| g | 84 | 0.057 | 0.005 | 0.093 | 0.008 | 0.092 | 0.008 | 0.097 | 0.008 |
| h | 100 | 0.073 | 0.005 | 0.118 | 0.007 | 0.093 | 0.006 | 0.099 | 0.006 |
| i | 125 | | | | | 0.148 | 0.006 | 0.163 | 0.007 |
| Total | | 3.465 | | 1.219 | | 3.693 | | 1.333 | |

* Column number.

The time at which a substantially constant rate of cation liberation, and hence a constant value of current was reached is seen to be 48 hours after the start of the experiment in the case of the 25 gram sample, and 72 hours in the case of the 50 gram sample, which gave the more concentrated suspension. The value of a saving of 24 hours can readily be appreciated. It is recommended that the size of a sample of muck or peat soil taken for dialysis be only about twenty five percent (25%) of the size of the mineral soil sample which is found convenient for the same experiment.

In Table II it is seen that the amounts of anions liberated from the soils are much less than the amounts of cations. This phenomenon is only what could be expected since most of the cations liberated have been associated with the acidoid soil complexes, which remain in the middle compartment because the membranes are impermeable to colloids.

It is the total quantity of readily available base cations which indicates to a large extent whether or not the soils are rich in plant nutrients.

During electrodialysis, as the number of soil cations becomes less than the number of soil anions in the main chamber, the place of the cations which have been lost must, of course, be taken by positive hydrogen ions, in order that the number of cations may remain equal to the number of anions. Thus a gradual increase in acidity will take place in the soil suspension.

It will be noted that the influence of the different treatments is most pronounced at the beginning of the experiments, and that little by little the amounts of cations liberated per hour from the same soil tend to become constant. The total quantity of cations which has been given off, however, continues to increase so that it is of interest to know at what time the process of electrodialysis of a given sample is finished. How far the totals in Table II really represent the so-called exchangeable or adsorbed cations in the soil is therefore a question which requires examination.

It is desirable to call attention to the fact that the term "exchangeable" or "replaceable" cations very often is used as a designation for all the cations liberated from soils regardless of whether or not their source is the adsorbed cations or the cations from easily soluble salts present in the soils. In many cases, especially in soils from humid regions, the amount of cations from easily soluble salts is small compared to the amount of adsorbed cations; but however small the former amount it presumably will be liberated at the beginning of the experiment.

Beside removing cations from easily soluble salts, electrodialysis is supposed to involve a dissolving or weathering effect on the soil particles themselves, so that the cation totals obtained also include cations from more difficultly soluble salts and the soil complexes.

The rate of cation liberation due to dissolving processes may increase during the time of dialysis as a result of the increasing acidity of the soil suspension, although the differences in the quantities of ions liberated under somewhat different acidities of solution are not found to be very great. Yet if the increasing acidity of the solution is neglected it seems more reasonable to assume that the rate decreases with time since the previously most weathered particles disappear first so that the unweathered minerals are left. The easily soluble salts go into solution and the cations are removed from the soil suspension to the greatest extent in the beginning of the experiments. If these circumstances are taken into consideration the rate of cation liberation from soluble salts and by weathering effect on the soil complexes appears to be approximately constant during the whole experiment. If the total quantity from these two sources could be found and subtracted from the total amount of cations liberated the remainder should be the exchangeable cations.

When a point of minimum cation liberation is reached the amounts of cations which are still liberated from the soil suspension remain approximately constant from interval to interval. All the cations extracted after this point has been reached presumably are removed as a result of the dissolving processes which go on in the suspension. If these processes have been going on at the same rate as long as the experiment has run, the correction to be subtracted from the total should be the average amount of cations liberated per hour, after a constant value per time unit is obtained, multiplied by the number of hours of the experiment. This product subtracted from the total sum should give the exchangeable cations.

The method of calculation described, as applied to some actual experimental results, is illustrated in Table III.

*Table III*

| Soil number | Length of experiment in hours | Final cation liberation per hour in M.e. | Correction in M.e. | Total amount of cations from the soil, M.e. | Exchangeable cations in M.e. | Mean M.e. | Water extraction |
|---|---|---|---|---|---|---|---|
| 7A | 150 | 0.003 | 0.450 | 2.634 | 2.184 | 2.188 | 0.249 |
| 7A | 150 | 0.003 | 0.450 | 2.641 | 2.191 | | |
| 49A | 100 | 0.005 | 0.500 | 3.465 | 2.965 | 2.954 | 0.117 |
| 49A | 125 | 0.006 | 0.750 | 3.693 | 2.943 | | |
| 50A | 100 | 0.006 | 0.600 | 4.690 | 4.050 | 4.001 | 0.225 |
| 50A | 150 | 0.005 | 0.750 | 4.701 | 3.951 | | |
| 14A | 120 | 0.038 | 4.560 | 23.109 | 18.549 | 18.549 | 0.176 |

The last column has been added to Table III in order to show the relatively small amounts of cations which can be extracted from the soil suspensions when mere water extraction is used instead of electrodialysis. All the amounts of cations in the table are expressed in milliequivalents per 100 grams of soil.

Because of its superiority to other methods of soil analysis, electrodialysis is being widely adopted by soil investigators. Chemical analysis cannot compare with electrodialysis as a method of determining the richness of a soil.

Ontario loam is known as a very much more productive type of soil than Volusia silt loam. In Table IV are shown the total percentages of the most important base cations found in samples of the two soils by ordinary chemical analysis.

*Table IV.—Constituents in soil, dry basis*

| Soil number | Soil types | Nitrogen (N) | Phosphorus (P) | Sulphur (S) | Potassium (K) | Calcium (Ca) | Magnesium (Mg) |
|---|---|---|---|---|---|---|---|
| 7A | Volusia silt loam | Percent 0.194 | Percent 0.076 | Percent 0.064 | Percent 1.66 | Percent 0.18 | Percent 0.22 |
| 49A | Volusia silt loam | 0.134 | 0.046 | 0.063 | 1.81 | 0.49 | 0.52 |
| 50A | Volusia silt loam | 0.205 | 0.078 | 0.071 | 2.17 | 0.41 | 0.64 |
| 14A | Ontario loam | 0.143 | 0.048 | 0.063 | 2.44 | 1.08 | 0.85 |

(After Bizzell.)

When the data of Table IV are compared with the data of Table III, the superiority for comparing soil fertilities of determinations made by means of the invention which has been described, is apparent.

I claim as my invention:

1. In an electrodialyzer, a globular central chamber having opposed lateral openings, lateral chambers having openings aligned with the openings of the globular chamber, electrodialysis membranes separating the chambers, means for passing an electric current through the globular chamber and the membranes, means in the globular chamber for stirring the material under treatment, and means outside the globular chamber for cooling it.

2. In an electrodialyzer, central and lateral chambers having mating openings in their walls, electrodialysis membranes separating the chambers at the openings, means for stirring the material under treatment in the central chamber and means for applying a cooling agent to the exterior of the central chamber.

3. In an electrodialyzer, a globular chamber having an upwardly directed neck, and a nozzle about the neck for delivering a cooling fluid on the exterior of the chamber.

4. In an electrodialyzer, a globular chamber having an upwardly directed neck, and a nozzle about the neck for delivering a cooling liquid on the exterior of the chamber, and a basin below the chamber to receive the cooling liquid.

5. In an electrodialyzer, a globular chamber having an upwardly directed neck, and a nozzle about the neck for delivering a cooling liquid on the exterior of the chamber, a basin below the chamber to receive the cooling liquid, and baffles extending below the equator to direct the flow of the liquid.

6. In an electrodialyzer, a globular chamber having an upwardly directed neck, and a nozzle about the neck for delivering a cooling liquid on the exterior of the chamber, a basin below the chamber to receive the cooling liquid, and a drain depending from the chamber and extending through the basin.

7. In an electrodialyzer, a globular treatment chamber having a neck with a bulge to receive the increase resulting from osmosis.

8. In an electrodialyzer, a plurality of separately made chambers separated by membranes and a supporting frame including lengthwise supports at each side and cross bearers carried by the supports and each receiving adjacent portions of two of the chambers.

9. In an electrodialyzer, a plurality of separately made chambers separated by membranes and a supporting frame including lengthwise supports at each side and cross bearers carried by the supports and each receiving adjacent portions of two of the chambers, and means for clamping the chambers together.

10. In an electrodialyzer, a frame, a plurality of chambers adapted to be supported and clamped in position on said frame having openings in their tops and drains with cocks in their bottoms, and connected by passages which are obstructed by membranes, one of said chambers being globular in shape and having an enlarged neck, means for cooling the exterior of the globular chamber, means for stirring the material in the globular chamber, and means for passing an electric current from one end chamber to the other end chamber, through liquids contained in the chambers.

11. An electrodialyzer including a primary treatment chamber having a generally globular shape, and having lateral openings adapted to be fitted with electrodialysis membranes for partitioning it off from dialysate chambers.

12. An apparatus for electrodialysis comprising a primary treatment chamber having generally the shape of a globe, and having lateral openings adapted to be fitted with membranes for partitioning it from dialysate chambers, and means for stirring material contained in the primary treatment chamber.

13. An apparatus for electrodialysis including a primary treatment chamber having a generally globular shape, with an enlarged neck and lateral openings for registry through membranes with openings in dialysate chambers, and means for stirring the contents of the primary treatment chamber.

AASULV LÖDDESÖL.